US012756024B2

(12) United States Patent
Yu et al.

(10) Patent No.: US 12,756,024 B2
(45) Date of Patent: Oct. 6, 2026

(54) DEVICE AND METHOD FOR SENSING STATE OF BATTERY CELL

(71) Applicant: SK ON CO., LTD., Seoul (KR)

(72) Inventors: Jeong Hyeon Yu, Daejeon (KR); Da Young Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 475 days.

(21) Appl. No.: 18/235,128

(22) Filed: Aug. 17, 2023

(65) Prior Publication Data

US 2024/0063448 A1 Feb. 22, 2024

(30) Foreign Application Priority Data

Aug. 18, 2022 (KR) ........................ 10-2022-0103511

(51) Int. Cl.
*H01M 10/48* (2006.01)

(52) U.S. Cl.
CPC ......... *H01M 10/48* (2013.01); *H01M 10/482* (2013.01)

(58) Field of Classification Search
CPC ............... H01M 10/48; H01M 10/482; H01M 10/4285; H01M 50/531; Y02E 60/10; G01R 31/385; G01N 21/88; G01B 21/08
See application file for complete search history.

(56) References Cited

U.S. PATENT DOCUMENTS

| | | | | |
|---|---|---|---|---|
| 6,215,311 | B1 * | 4/2001 | Miyamoto | H01M 10/48 324/432 |
| 2024/0319108 | A1 * | 9/2024 | Fan | G01B 11/0691 |

FOREIGN PATENT DOCUMENTS

| | | | | | |
|---|---|---|---|---|---|
| CN | 109343072 | A | * | 2/2019 | G01S 17/48 |
| CN | 208848988 | U | * | 5/2019 | |
| CN | 112099043 | A | * | 12/2020 | G01S 17/88 |
| CN | 112331899 | A | * | 2/2021 | H01M 10/0404 |
| CN | 113820333 | A | * | 12/2021 | G06F 18/23213 |
| JP | 2005181023 | A | * | 7/2005 | |
| JP | 3770484 | B2 | | 4/2006 | |
| KR | 101963741 | B1 | | 3/2019 | |
| KR | 1020220021723 | A | | 2/2022 | |
| KR | 102369375 | B1 | * | 3/2022 | B23K 37/0408 |

* cited by examiner

*Primary Examiner* — Yossef Korang-Beheshti
(74) *Attorney, Agent, or Firm* — The Webb Law Firm

(57) ABSTRACT

A device and method of sensing a state of a battery cell disposed on a mounting unit are disclosed. The method includes a height information acquisition step of acquiring, by a height measurement unit disposed on the mounting unit on which the battery cell is disposed, first height information on a first height that is a height of the height measurement unit with respect to a point of the mounting unit and second height information on a second height that is the height of the height measurement unit with respect to a point of the battery cell, and a battery cell state analysis step of determining, by a controller, a state of the battery cell based on the first height information and the second height information.

18 Claims, 11 Drawing Sheets

DEVICE AND METHOD FOR SENSING STATE OF BATTERY CELL

CROSS-REFERENCE TO RELATED APPLICATION

This application claims priority to Korean Patent Application No. 10-2022-0103511 filed Aug. 18, 2022, the disclosure of which is hereby incorporated by reference in its entirety.

BACKGROUND OF THE INVENTION

Field of the Invention

The present disclosure relates to a battery cell state sensing device. More particularly, the present disclosure relates to a device that senses a state of a battery cell disposed on a mounting unit and detects whether a tab is lifted or whether the battery cell is disposed in place.

Description of Related Art

When a battery cell is in an abnormal state because a tab included in the battery cell lifts or sags, a problem may occur in a process of modularizing the battery cells. Alternatively, when the battery cell on a mounting unit is biasly disposed on one side of the mounting unit, a problem may occur in the process of modularizing the battery cells. Therefore, before modularizing the battery cells, it is necessary to find the battery cell of the abnormal state and take action.

In a related art, in order to detect the battery cell of the abnormal state, a worker visually inspected the battery cells. However, since the worker had to perform the inspection while the battery cells were being transported, there was a problem in that the accuracy of the inspection result was low. In addition, because it was difficult to quantify inspection criteria, there was a problem in which the inspection result was unclear.

Accordingly, there is a need for a device capable of accurately sensing the state of the battery cells based on clear criteria.

According to a 'method of inspecting a terminal installed in a battery' disclosed in Japanese Patent No. 3770484 (hereinafter, 'patent document 1'), the method can obtain an image of a battery terminal, on which light is irradiated by lighting, using a camera, calculate a height of the terminal based on the image, and then determine whether the terminal is defective.

In the method disclosed in the 'patent document 1', the lighting and the camera need to be disposed with the battery terminal interposed between them. Since the battery terminal cited as an example in the 'patent document 1' is formed on an upper side of the battery, the lighting and the camera need to be disposed in a horizontal direction of the terminal.

When the battery terminal disposed on an upper surface of the mounting unit is disposed on a horizontal plane parallel to the upper surface of the mounting unit, it is difficult to sufficiently secure a space to install the lighting or the camera between the terminal and the mounting unit. Accordingly, it is difficult to apply the method disclosed in the 'patent document 1'.

PRIOR ART DOCUMENT

[Patent Document]

Japanese Patent No. 3770484

SUMMARY OF THE INVENTION

An object of the present disclosure is to address the above-described and other problems.

Another object of the present disclosure is to detect whether a tab is lifted using height information of a height measurement unit with respect to a point of a mounting unit or a point of a battery cell.

Another object of the present disclosure is to detect whether a battery cell is normally disposed using height information of a height measurement unit with respect to a point of a mounting unit or a point of the battery cell.

In order to achieve the above-described and other objects and needs, in one aspect of the present disclosure, there is provided a method of sensing a state of a battery cell, the method comprising a height information acquisition step of acquiring, by a height measurement unit disposed on an upper part of a mounting unit on which the battery cell is disposed, first height information on a first height that is a height of the height measurement unit with respect to a point of the mounting unit and second height information on a second height that is the height of the height measurement unit with respect to a point of the battery cell, and a battery cell state analysis step of determining, by a controller, a state of the battery cell based on the first height information and the second height information.

In another aspect of the present disclosure, there is provided a method of sensing a state of a battery cell, the method comprising a height information acquisition step of acquiring, by a height measurement unit disposed at a preset height from an upper surface of a mounting unit on which the battery cell is disposed, height information of the height measurement unit with respect to a point of the battery cell, and a battery cell state analysis step of determining, by a controller, a state of the battery cell based on the preset height and the height information.

In another aspect of the present disclosure, there is provided a device of sensing a state of a battery cell disposed on a mounting unit and including a tab, the device comprising a height measurement unit disposed on an upper part of the mounting unit, and a controller connected to the height measurement unit, wherein the height measurement unit acquires first height information on a first height that is a height of the height measurement unit with respect to a point of the mounting unit, and second height information on a second height that is the height of the height measurement unit with respect to a point of the battery cell, and wherein the controller determines a state of the battery cell based on the first height information and the second height information.

Effects of a device and method for sensing a state of a battery cell according to the present disclosure are described as follows.

According to at least one aspect of the present disclosure, the present disclosure can detect whether a tab is lifted using height information of a height measurement unit with respect to a point of a mounting unit or a point of a battery cell.

According to at least one aspect of the present disclosure, the present disclosure can detect whether a battery cell is normally disposed using height information of a height measurement unit with respect to a point of a mounting unit or a point of the battery cell.

According to at least one aspect of the present disclosure, the present disclosure can acquire height information of a height measurement unit with respect to a point of a mounting unit or a point of a battery cell using at least one of a laser, an ultrasonic wave, a microwave, or infrared light.

Additional scope of applicability of the present disclosure will become apparent from the detailed description given blow. However, it should be understood that the detailed description and specific examples such as embodiments of the present disclosure are given merely by way of example, since various changes and modifications within the spirit and scope of the present disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of the disclosure, illustrate embodiments of the disclosure and together with the description serve to explain the principle of the disclosure.

FIG. 6 illustrates positions of points P1 and P2 to acquire height information when a first tab 220 of the battery cell 200 is lifted.

FIG. 7 illustrates positions of points P1, P2, P3, and P4 to acquire height information when the first tab 220 of the battery cell 200 is lifted.

FIG. 8 illustrates positions of points P1, P2, P3, and P4 to acquire height information when the battery cell 200 is biasly disposed on one side of the mounting unit 100.

DESCRIPTION OF THE INVENTION

Figure 1:
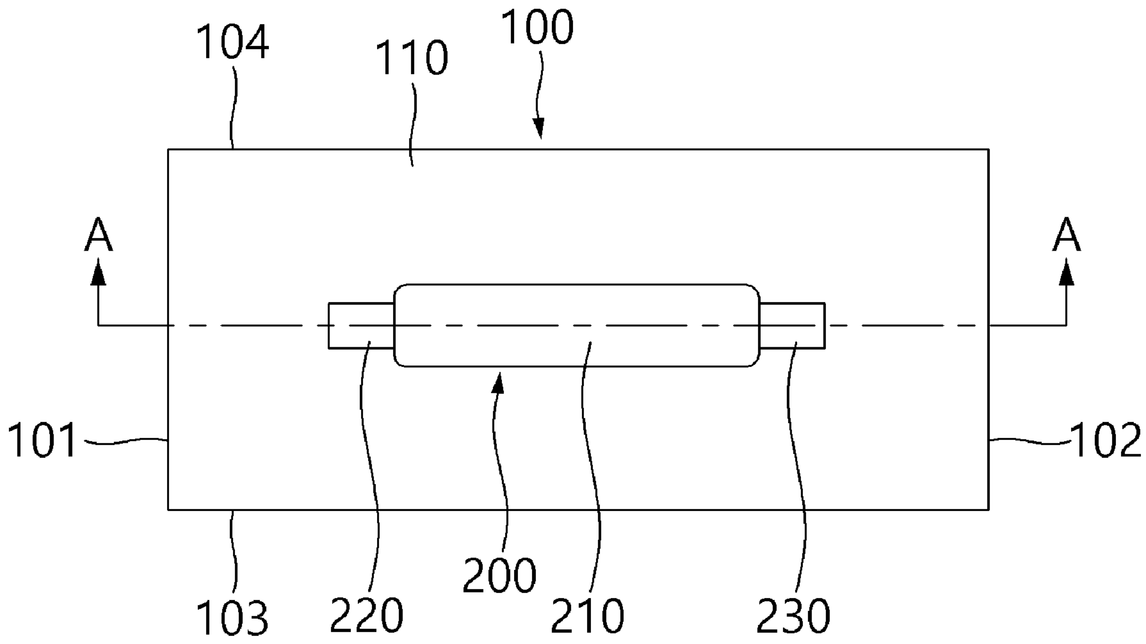
FIG. 1 is a plan view illustrating a battery cell 200 disposed on a mounting unit 100.

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When any component is described as "being connected" or "being coupled" to other component, this should be understood to mean that another component may exist between them, although any component may be directly connected or coupled to the other component. In contrast, when any component is described as "being directly connected" or "being directly coupled" to other component, this should be understood to mean that no component exists between them.

A singular expression can include a plural expression as long as it does not have an apparently different meaning in context.

In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

In the drawings, sizes of the components may be exaggerated or reduced for convenience of explanation. For example, the size and the thickness of each component illustrated in the drawings are arbitrarily illustrated for convenience of explanation, and thus the present disclosure is not limited thereto unless specified as such.

If any embodiment is implementable differently, a specific order of processes may be performed differently from the order described. For example, two consecutively described processes may be performed substantially at the same time, or performed in the order opposite to the described order.

In the following embodiments, when layers, areas, components, etc. are connected, the following embodiments include both the case where layers, areas, and components are directly connected, and the case where layers, areas, and components are indirectly connected to other layers, areas, and components intervening between them. For example, when layers, areas, components, etc. are electrically connected, the present disclosure includes both the case where layers, areas, and components are directly electrically connected, and the case where layers, areas, and components are indirectly electrically connected to other layers, areas, and components intervening between them.

Figure 2:
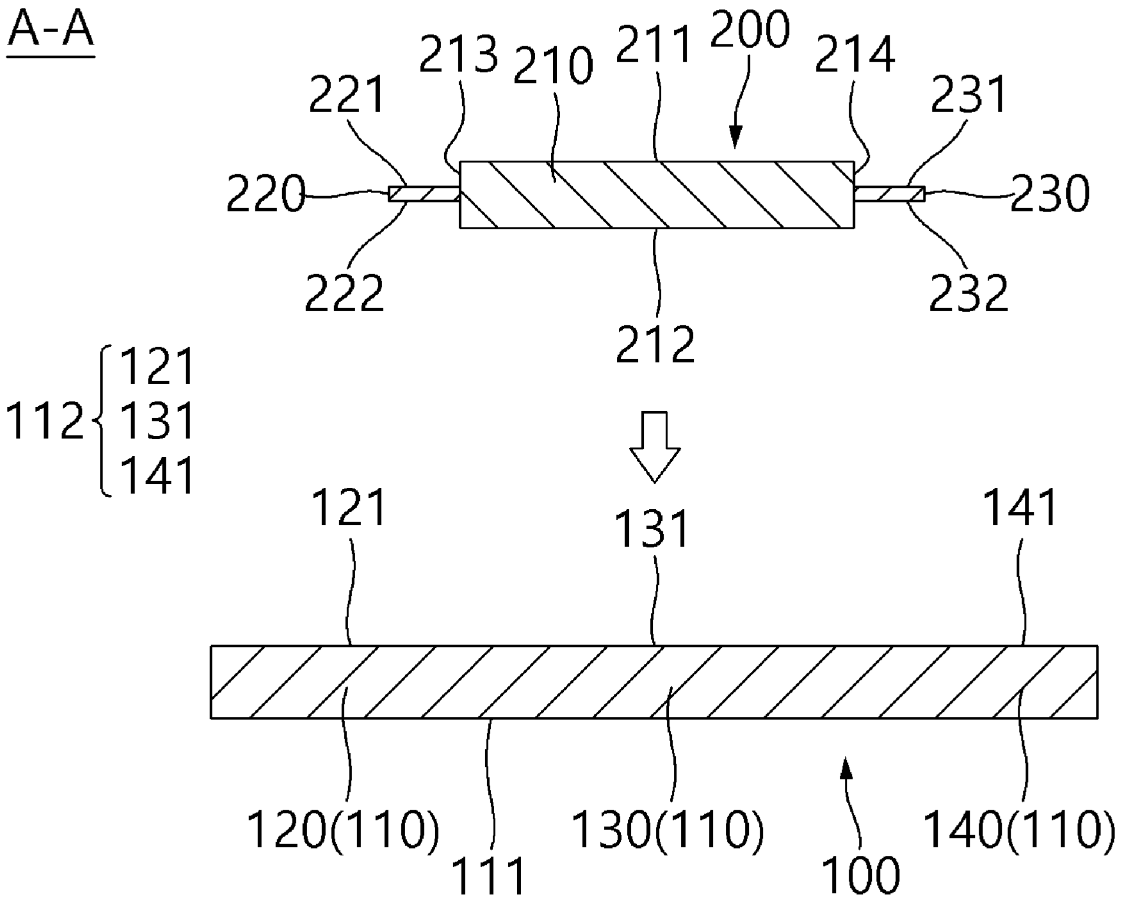
FIG. 2 is an A-A cross-sectional view taken along line A-A of FIG. 1 illustrating that the battery cell 200 is disposed on the mounting unit 100.

FIG. 1 is a plan view illustrating a battery cell 200 disposed on a mounting unit 100. FIG. 2 is an A-A cross-sectional view taken along line A-A of FIG. 1 illustrating that the battery cell 200 is disposed on the mounting unit 100.

The mounting unit 100 may indicate at least a portion of a tray, a container, a plate, a conveyor belt, or a stage.

The mounting unit 100 may extend from one end to other end. For example, the one end of the mounting unit 100 may be a left end 101, and the other end of the mounting unit 100 may be a right end 102. For example, a longitudinal direction of the mounting unit 100 may be parallel to a left-right direction. Further, the mounting unit 100 may extend from a front end 103 to a rear end 104. For example, a width direction of the mounting unit 100 may be parallel to a front-rear direction.

The mounting unit 100 may include a base 110. The base 110 may be formed in the form of a flat plate. For example, the base 110 may be formed in the form of a rectangular plate.

The base 110 may include a base lower surface 111. The base lower surface 111 may be disposed opposite a surface of the base 110 on which the battery cell 200 is disposed.

The base 110 may include a base upper surface 112. The base upper surface 112 may be positioned on the base lower surface 111. The battery cell 200 may be disposed on the base upper surface 112.

The base 110 may include one end portion 120 including the one end of the mounting unit 100. The one end portion 120 may include the left end 101 of the mounting unit 100. The one end portion 120 may include an one end portion upper surface 121.

The base 110 may include other end portion 140 including the other end of the mounting unit 100. The other end portion 140 may include the right end 102 of the mounting unit 100. The other end portion 140 may include an other end portion upper surface 141.

The base 110 may include an intermediate portion 130 disposed between the one end portion 120 and the other end portion 140. The intermediate portion 130 may be connected to the one end portion 120 and the other end portion 140. The intermediate portion 130 may include an intermediate portion upper surface 131. The intermediate portion upper surface 131 may be connected to the one end portion upper surface 121 and the other end portion upper surface 141.

The base upper surface 112 may indicate at least one of the one end portion upper surface 121, the intermediate portion upper surface 131, and the other end portion upper surface 141.

The battery cell 200 may extend in a direction in which the one end of the mounting unit 100 faces the other end of the mounting unit 100. A longitudinal direction of the battery cell 200 may be parallel to the left-right direction. The battery cell 200 may be disposed between the one end of the mounting unit 100 and the other end of the mounting unit 100.

The battery cell 200 may include a cell body 210. The cell body 210 may extend in the longitudinal direction of the battery cell 200.

The cell body 210 may include a cell body upper surface 211. The cell body upper surface 211 may be positioned higher than tabs 220 and 230.

The cell body 210 may include a cell body lower surface 212. The cell body lower surface 212 may be positioned below the cell body upper surface 211. The cell body lower surface 212 may contact the base upper surface 112.

The cell body 210 may include a cell body left side surface 213. The cell body left side surface 213 may connect a left side of the cell body upper surface 211 and a left side of the cell body lower surface 212. The cell body left side surface 213 may be disposed to face the one end portion 120 of the base 110.

The cell body 210 may include a cell body right side surface 214. The cell body right side surface 214 may connect a right side of the cell body upper surface 211 and a right side of the cell body lower surface 212. The cell body right side surface 214 may be disposed to face the other end portion 140 of the base 110.

The battery cell 200 may include the tabs 220 and 230. The tabs 220 and 230 may include a first tab 220 and a second tab 230. The tabs 220 and 230 may indicate at least one of the first tab 220 and the second tab 230.

The first tab 220 may extend from the cell body left side surface 213. For example, the first tab 220 may extend in the longitudinal direction of the battery cell 200. The first tab 220 may be disposed between the left end 101 of the mounting unit 100 and the cell body 210.

The first tab 220 may include a first tab upper surface 221. The first tab upper surface 221 may be positioned below the cell body upper surface 211. When a point of the first tab upper surface 221 is raised, the first tab 220 may be in a lifted state.

The first tab 220 may include a first tab lower surface 222. The first tab lower surface 222 may face the base upper surface 112. The first tab lower surface 222 may be spaced apart from the base upper surface 112.

The second tab 230 may extend from the cell body right side surface 214. For example, the second tab 230 may extend in the longitudinal direction of the battery cell 200. The second tab 230 may be disposed between the right end 102 of the mounting unit 100 and the cell body 210.

The second tab 230 may include a second tab upper surface 231. The second tab upper surface 231 may be positioned below the cell body upper surface 211. When a point of the second tab upper surface 231 is raised, the second tab 230 may in a lifted state.

The second tab 230 may include a second tab lower surface 232. The second tab lower surface 232 may face the base upper surface 112. The second tab lower surface 232 may be spaced apart from the base upper surface 112.

Figure 3:
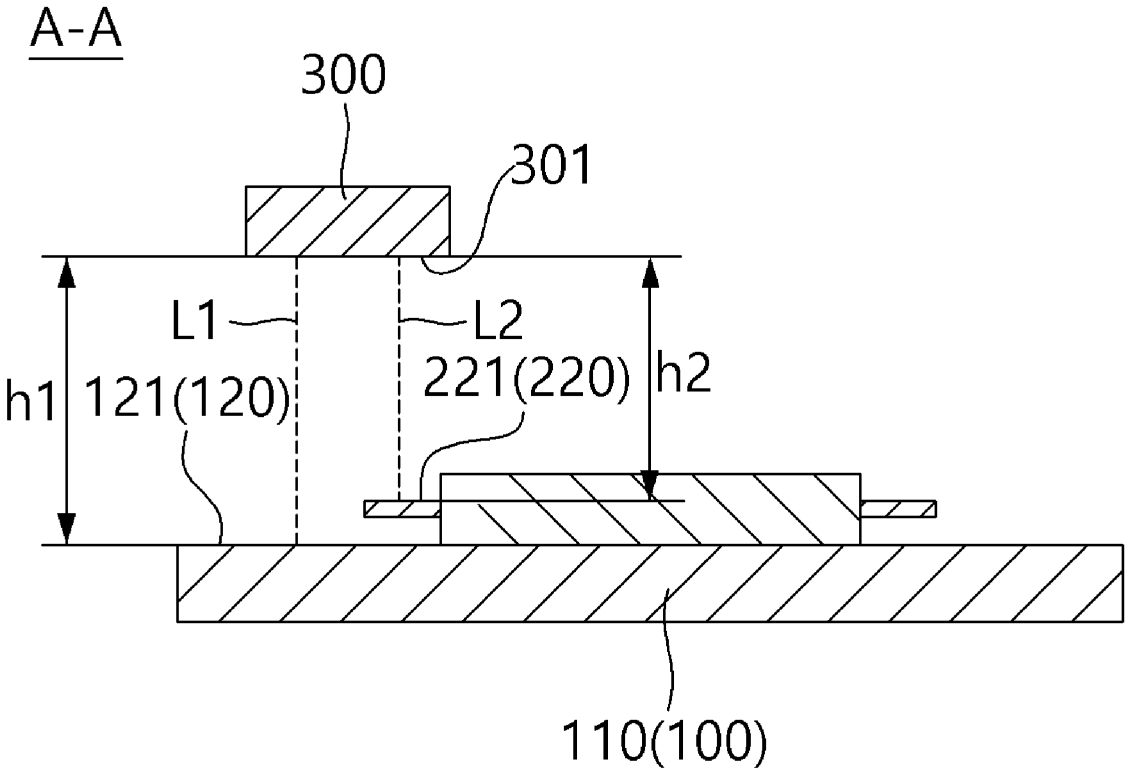
FIG. 3 is an A-A cross-sectional view illustrating the mounting unit 100 and the battery cell 200 of FIG. 2 and a height measurement unit 300 according to an embodiment of the present disclosure.

FIG. 3 is an A-A cross-sectional view illustrating the mounting unit 100 and the battery cell 200 of FIG. 2 and a height measurement unit 300 according to an embodiment of the present disclosure.

A state in which the battery cell 200 is normally disposed on the mounting unit 100 may be referred to as a normal state ST1, and a state in which the battery cell 200 is abnormally disposed on the mounting unit 100 may be referred to as an abnormal state ST2.

The normal state ST1 may refer to a state in which the tabs 220 and 230 are not lifted from the cell body 210. The normal state ST1 may refer to a state in which the tabs 220 and 230 do not sag with respect to the cell body 210. The normal state ST1 may refer to a state in which the battery cell 200 is disposed on the intermediate portion upper surface 131 of the mounting unit 100. The normal state ST1 may refer to a state in which the battery cell 200 is not biasly disposed on the one end portion upper surface 121 or the other end portion upper surface 141 of the mounting unit 100.

The abnormal state ST2 may refer to a state in which the tabs 220 and 230 are lifted. The abnormal state ST2 may refer to a state in which the tabs 220 and 230 sag. The abnormal state ST2 may refer to a state in which the battery cell 200 is biasly disposed on the one end portion upper surface 121 or the other end portion upper surface 141 of the mounting unit 100.

The height measurement unit 300 may be disposed on the mounting unit 100. The height measurement unit 300 may be disposed on the battery cell 200. The height measurement unit 300 may measure a height of one point on the mounting unit 100 or a height of one point on the battery cell 200. The height measurement unit 300 may measure a height of the height measurement unit 300 with respect to one point on the mounting unit 100 or one point on the battery cell 200.

The height measurement unit 300 may include a reference plane 301. For example, the reference plane 301 may be a lower surface of the height measurement unit 300. The height measurement unit 300 may measure a height of the reference plane 301 with respect to one point on the mounting unit 100 or one point on the battery cell 200.

The height measurement unit 300 may include a transmitter 310 (see FIG. 11) outputting an incident wave. The transmitter 310 may be disposed on the reference plane 301. The transmitter 310 may output the incident wave toward one point on the mounting unit 100 or one point on the battery cell 200. The incident wave may be output in a direction parallel to the height direction.

The height measurement unit 300 may include a receiver 320 (see FIG. 11) detecting a reflected wave. The receiver 320 may be disposed on the reference plane 301. The reflected wave may be generated by reflecting the incident wave from one point on the mounting unit 100 or one point on the battery cell 200.

The incident wave output from the transmitter 310 may include at least one of a laser, an ultrasonic wave, a microwave, and infrared light. The reflected wave may include the same wave as the incident wave.

The height measurement unit 300 may include at least one of a laser displacement sensor, an ultrasonic displacement sensor, a microwave displacement sensor, or an infrared displacement sensor.

For example, the transmitter 310 and the receiver 320 may be disposed at different positions. A height of the reference plane 301 with respect to one point on the mounting unit 100 or one point on the battery cell 200 may be calculated using an angle between the incident wave output from the transmitter 310 and the reflected wave detected by the receiver 320.

For example, the height of the reference plane 301 with respect to one point on the mounting unit 100 or one point on the battery cell 200 may be calculated by measuring the time that it takes for the transmitter 310 to output the incident wave and the receiver 320 to detect the reflected wave.

For example, the height of the reference plane 301 with respect to one point on the mounting unit 100 or one point on the battery cell 200 may be calculated by comparing a frequency of the incident wave output from the transmitter 310 with a frequency of the reflected wave detected by the receiver 320.

An incident wave that the transmitter 310 outputs toward one point of the one end portion upper surface 121 of the base 110 may be referred to as a first incident wave L1. The height of the reference plane 301, with respect to one point of the one end portion upper surface 121, which is calculated by the first incident wave L1 and a first reflected wave (not shown) generated by reflecting the first incident wave L1 may be referred to as a first height h1.

An incident wave that the transmitter 310 outputs toward one point of the first tab upper surface 221 may be referred to as a second incident wave L2. The height of the reference plane 301, with respect to one point of the first tab upper surface 221, which is calculated by the second incident wave L2 and a second reflected wave (not shown) generated by reflecting the second incident wave L2 may be referred to as a second height h2.

A value obtained by subtracting the second height h2 from the first height h1 may be referred to as a first height difference d1. The first height difference d1 may be a height of the first tab upper surface 221 with respect to one point of the one end portion upper surface 121. When the first height difference d1 is within a preset range, it may be determined that the first tab 220 is in the normal state ST1. When the first height difference d1 is out of the preset range and is greater than a maximum value of the preset range, it may be determined that the first tab 220 is lifted and is in the abnormal state ST2. When the first height difference d1 is out of the preset range and is less than a minimum value of the preset range, it may be determined that the first tab 220 sags and is in the abnormal state ST2.

When the first height difference d1 is less than or equal to a preset value d0, it may be determined that the first tab 220 is not lifted. When the first height difference d1 exceeds the preset value d0, it may be determined that the first tab 220 is lifted. The preset value d0 may be the maximum value of the preset range.

Figure 4:
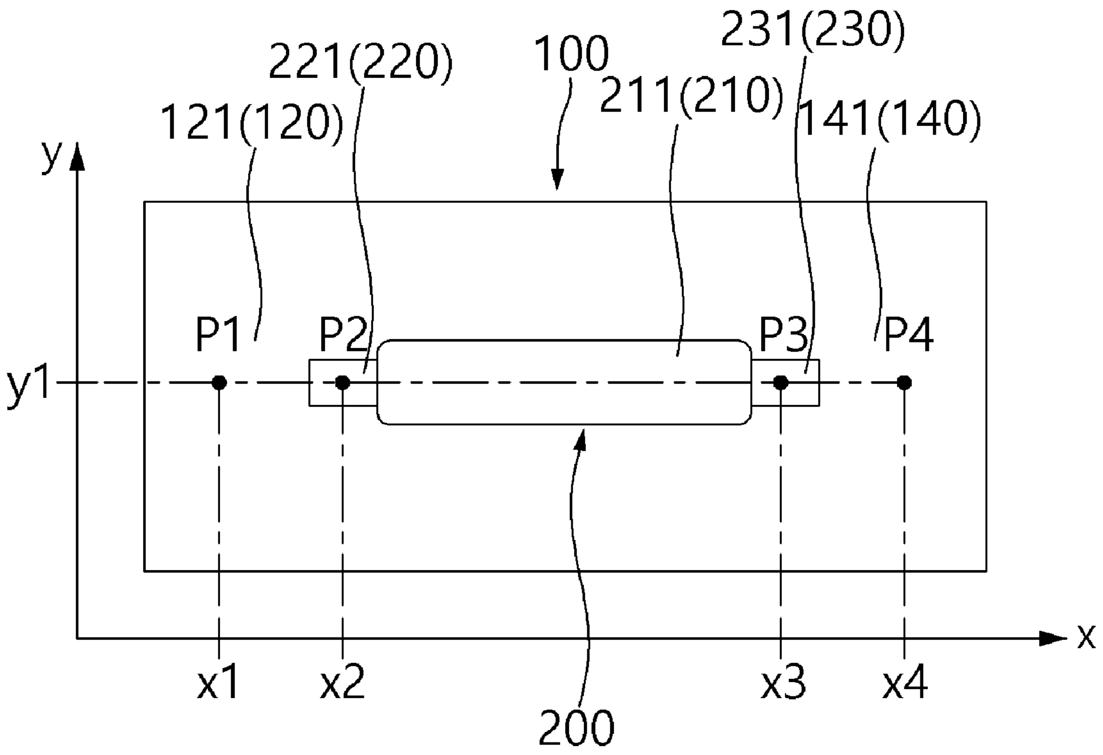
FIG. 4 illustrates, on xy plane, positions of points P1, P2, P3, and P4 to acquire height information of the mounting unit 100 and the battery cell 200 of FIG. 2.

FIG. 4 illustrates, on a horizontal plane, positions of points P1, P2, P3, and P4 to acquire height information of the mounting unit 100 and the battery cell 200 of FIG. 2. The horizontal plane may be xy plane. The points P1, P2, P3, and P4 may indicate at least one of a first point P1, a second point P2, a third point P3, and a fourth point P4.

The first point P1 may be a point acquiring height information for a point of the one end portion 120 of the base 110. For example, the first point P1 may be a point adjacent to the one end of the mounting unit 100 in the base upper surface 112 (see FIG. 2). For example, the first point P1 may be a point positioned on the one end portion upper surface 121. Coordinates of the first point P1 on the xy plane are (x1, y1), which may be referred to as a first coordinate.

The second point P2 may be a point spaced apart from the first coordinate toward the other end of the mounting unit 100 in the base upper surface 112. For example, the second point P2 may be a point acquiring height information for one point of the first tab 220. For example, the second point P2 may be a point positioned on the first tab upper surface 221 of the normal state ST1. Coordinates of the second point P2 on the xy plane are (x2, y1), which may be referred to as a second coordinate.

The third point P3 may be a point acquiring height information for a point of the second tab 230. For example, the third point P3 may be a point positioned on the second tab upper surface 231 of the normal state ST1. Coordinates of the third point P3 on the xy plane are (x3, y1), which may be referred to as a third coordinate.

The fourth point P4 may be a point acquiring height information for a point of the other end portion 140 of the base 110. For example, the fourth point P4 may be a point positioned on the other end portion upper surface 141. Coordinates of the fourth point P4 on the xy plane are (x4, y1), which may be referred to as a fourth coordinate.

Positions of the first point P1, the second point P2, the third point P3, and the fourth point P4 on the xy plane may be same regardless of the state of the battery cell 200. The first point P1 may be positioned at any one of the one end portion upper surface 121, the first tab upper surface 221, and the cell body upper surface 211. The second point P2 may be positioned at any one of the first tab upper surface 221, the cell body upper surface 211, and the one end portion upper surface 121. The third point P3 may be positioned at any one of the second tab upper surface 231, the cell body upper surface 211, and the one end portion upper surface 121. The fourth point P4 may be positioned at any one of the other end portion upper surface 141, the second tab upper surface 231, and the cell body upper surface 211.

The height information of the first point P1 may be a height of the reference plane 301 with respect to an upper end of an object placed at a point corresponding to the x and y coordinates of the first point P1. For example, when the one end portion 120 of the base 110 is at the point of the coordinates (x1, y1), the height information of the first point P1 may be a height of the reference plane 301 with respect to a point corresponding to the coordinates (x1, y1) in the one end portion upper surface 121. The height of the reference plane 301 with respect to the point corresponding to the coordinates (x1, y1) may be referred to as a first point height h_P1.

The height information of the second point P2, the height information of the third point P3, and the height information of the fourth point P4 may be acquired in the same method as a method of acquiring the height information of the first point P1. A height acquired at the point corresponding to the coordinates (x2, y1) may be referred to as a second point height h_P2. A height acquired at the point corresponding to the coordinates (x3, y1) may be referred to as a third point height h_P3. A height acquired at the point corresponding to the coordinates (x4, y1) may be referred to as a fourth point height h_P4.

Figure 5:
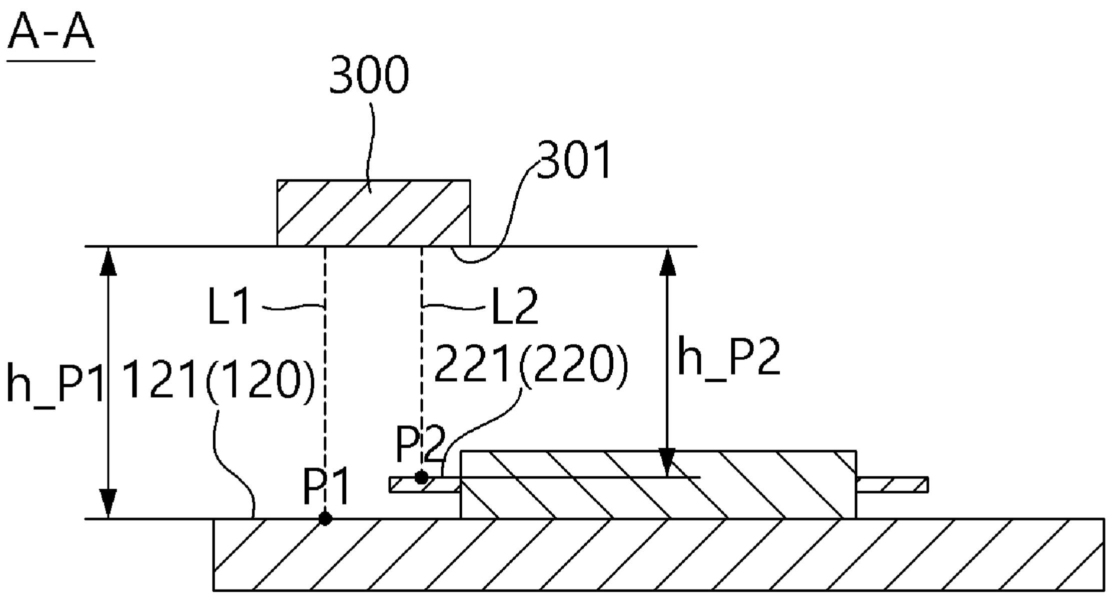
FIG. 5 is an A-A cross-sectional view illustrating positions of points P1 and P2 to acquire height information at the mounting unit 100 and the battery cell 200 of FIG. 3.

FIG. 5 is an A-A cross-sectional view illustrating positions of points P1 and P2 to acquire height information at the mounting unit 100 and the battery cell 200 of FIG. 3.

The first point P1 may be positioned on the one end portion upper surface 121. The second point P2 may be positioned on the first tab upper surface 221. A value obtained by subtracting the second point height h_P2 from the first point height h_P1 may be referred to as a second height difference d2.

When the second height difference d2 is within the preset range, it may be determined that the first tab 220 is in the normal state ST1. When the second height difference d2 is out of the preset range and is greater than the maximum value of the preset range, it may be determined that the first tab 220 is lifted and is in the abnormal state ST2. When the second height difference d2 is out of the preset range and is less than the minimum value of the preset range, it may be determined that the first tab 220 sags and is in the abnormal state ST2.

The second height difference d2 in the normal state ST1 may be less than or equal to the preset value d0. The preset value d0 may indicate the maximum value of the preset range.

Figure 6:
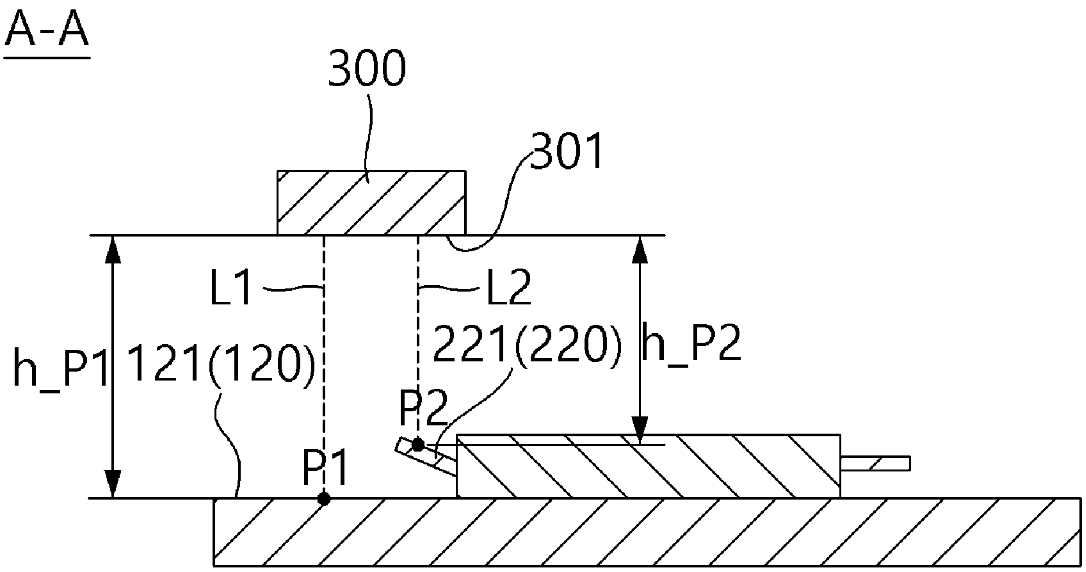
FIGS. 6 to 8 illustrate the battery cell 200 of an abnormal state on the mounting unit 100.
Figure 7:
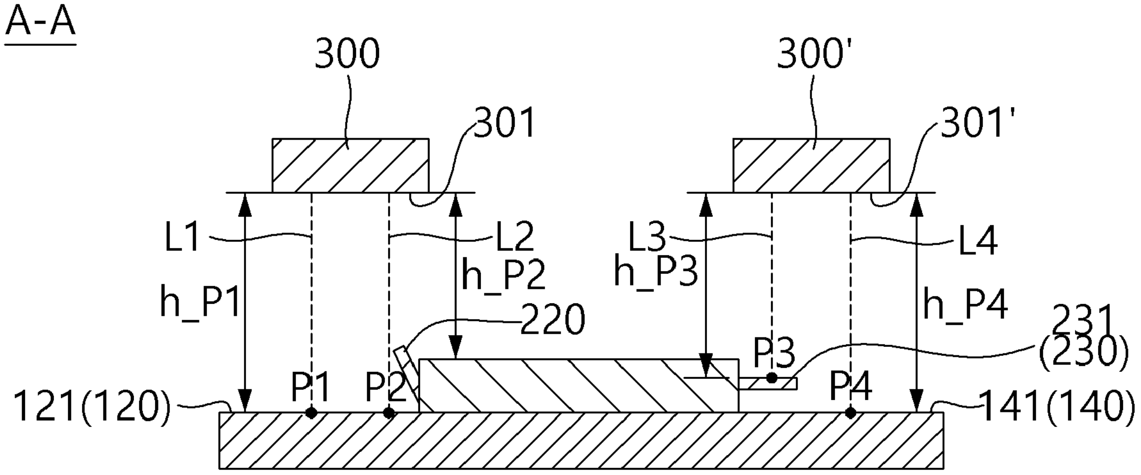
Figure 8:
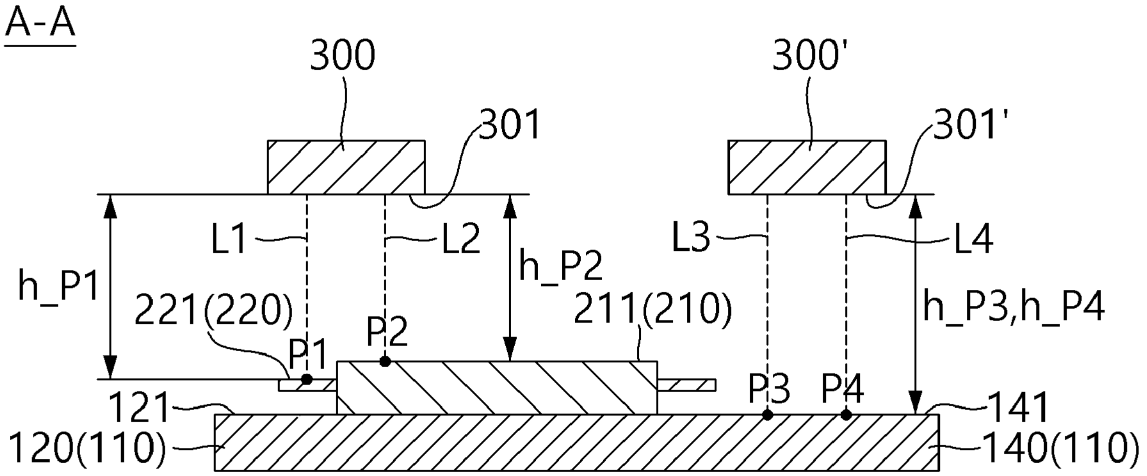

FIGS. 6 to 8 illustrate the battery cell 200 of the abnormal state on the mounting unit 100. FIG. 6 illustrates positions of the points P1 and P2 to acquire height information when the first tab 220 of the battery cell 200 is lifted.

As illustrated in FIG. 6, when the first tab 220 is lifted, the first tab upper surface 221 may rise than the first tab upper surface 221 in the normal state ST1. Hence, since the second point P2 rises, the second point height h_P2 may decrease, and the second height difference d2 obtained by subtracting the second point height h_P2 from the first point height h_P1 may increase. When the second height difference d2 is out of the preset range, it may be determined that the first tab 220 is in the abnormal state ST2.

The second height difference d2 may exceed the preset value d0. The preset value d0 may indicate the maximum value of the preset range.

FIG. 7 illustrates positions of points P1, P2, P3, and P4 to acquire height information when the first tab 220 of the battery cell 200 is lifted.

When the second point P2 is positioned on the first tab 220, the second point height h_P2 may decrease as the first tab 220 is lifted. When the first tab 220 is lifted above a predetermined angle with respect to the base upper surface 112, the first tab 220 may deviate from the second point P2. Hence, the second point P2 may be positioned on the one end portion upper surface 121. As a result, as an angle formed by the first tab 220 and the base upper surface 112 increases, the second point height h_P2 may gradually decrease, and the second point height h_P2 may increase when the angle reaches the predetermined angle. The second point height h_P2 at the predetermined angle may be equal to the first point height h_P1.

When the second point height h_P2 is equal to the first point height h_P1, it may be determined that the first tab 220 is lifted above the predetermined angle. Alternatively, it may be determined that the first tab 220 is not present. Alternatively, it may be determined that the battery cell 200 is not present.

In order to determine the presence or absence of the battery cell 200, the third point height h_P3 and the fourth point height h_P4 may be acquired and analyzed. In order to acquire height information of the third point P3 and height information of the fourth point P4, a height measurement unit 300' may be additionally disposed on the other end portion 140.

The third point P3 may be positioned on the second tab upper surface 231. The fourth point P4 may be positioned on the other end portion upper surface 141. A value obtained by subtracting the third point height h_P3 from the fourth point height h_P4 may be referred to as a third height difference d3.

When the third height difference d3 is within the predetermined range, it may be determined that the second tab 230 is in the normal state ST1. If the third height difference d3 is out of the preset range and is greater than the maximum value of the preset range, it may be determined that the second tab 230 is lifted and is in the abnormal state ST2. When the third height difference d3 is out of the preset range and is less than the minimum value of the preset range, it may be determined that the second tab 230 sags and is in the abnormal state ST2.

When the third point height h_P3 is equal to the fourth point height h_P4, it may be determined that the second tab 230 is lifted above the predetermined angle. Alternatively, it may be determined that the second tab 230 is not present. Alternatively, it may be determined that the battery cell 200 is not present.

When the second point height h_P2 is equal to the first point height h_P1 and the third point height h_P3 is equal to the fourth point height h_P4, it may be determined that the base upper surface 112 has been detected at the second point P2 and the third point P3. In this instance, it may be determined that both the first tab 220 and the second tab 230 are not in place. Alternatively, it may be determined that the battery cell 200 is not present.

In order to determine the presence or absence of the battery cell 200, it may be analyzed whether there is a point, where information on a height less than the second point height h_P2 or the third point height h_P3 is calculated, between the second point P2 and the third point P3. If there is a point where the information on the height less than the second point height h_P2 or the third point height h_P3 is calculated, it may be determined that the battery cell 200 is present, but both tabs 220 and 230 are problem. If there is no point where the information on the height less than the second point height h_P2 or the third point height h_P3 is calculated, it may be determined that the battery cell 200 is not present.

FIG. 8 illustrates positions of points P1, P2, P3, and P4 to acquire height information when the battery cell 200 is biasly disposed on one side of the mounting unit 100.

As illustrated in FIG. 8, when the first tab 220 is biasly disposed on the one end portion 120, the first point P1 may be positioned on the first tab 220 and the second point P2 may be positioned on the cell body 210. The first point P1 may be positioned on the first tab upper surface 221, and the second point P2 may be positioned on the cell body upper surface 211.

Depending on a thickness of the first tab 220, the second height difference d2 obtained by subtracting the second point height h_P2 from the first point height h_P1 may be within the preset range. In order to prevent an error in which the state of the battery cell 200 illustrated in FIG. 8 is determined to be the normal state ST1, it may be determined whether the position of the battery cell 200 is in the normal state ST1. To this end, it may be checked whether the first point height h_P1 is normal.

In order to check whether the first point height h_P1 is normal, it may be checked whether the first point P1 is positioned on the one end portion 120 of the base 110. In the normal state ST1, the first point P1 may be positioned on the one end portion 120, and the fourth point P4 may be positioned on the other end portion 140. Therefore, in the normal state ST1, the first point height h_P1 and the fourth point height h_P4 may be the same. When the battery cell 200 is positioned on the one end portion 120, the first point height h_P1 may be less than the fourth point height h_P4.

Accordingly, when the first point height h_P1 and the fourth point height h_P4 are the same, it may be determined that the first point height h_P1 is normal. When the first point height h_P1 is less than the fourth point height h_P4, the battery cell 200 may be positioned on the one end portion 120, and it may be determined that the first point height h_P1 is abnormal. In this instance, it may be determined that the state of the battery cell 200 is the abnormal state ST2.

Unlike the above, the first point P1 and the second point P2 may be positioned on the cell body 210. The first point P1 and the second point P2 may be positioned on the cell body upper surface 211. The first point height h_P1 and the second point height h_P2 may be the same. When the first point height h_P1 and the second point height h_P2 are the same, it may be determined that the state of the battery cell 200 is the abnormal state ST2.

Figure 9:
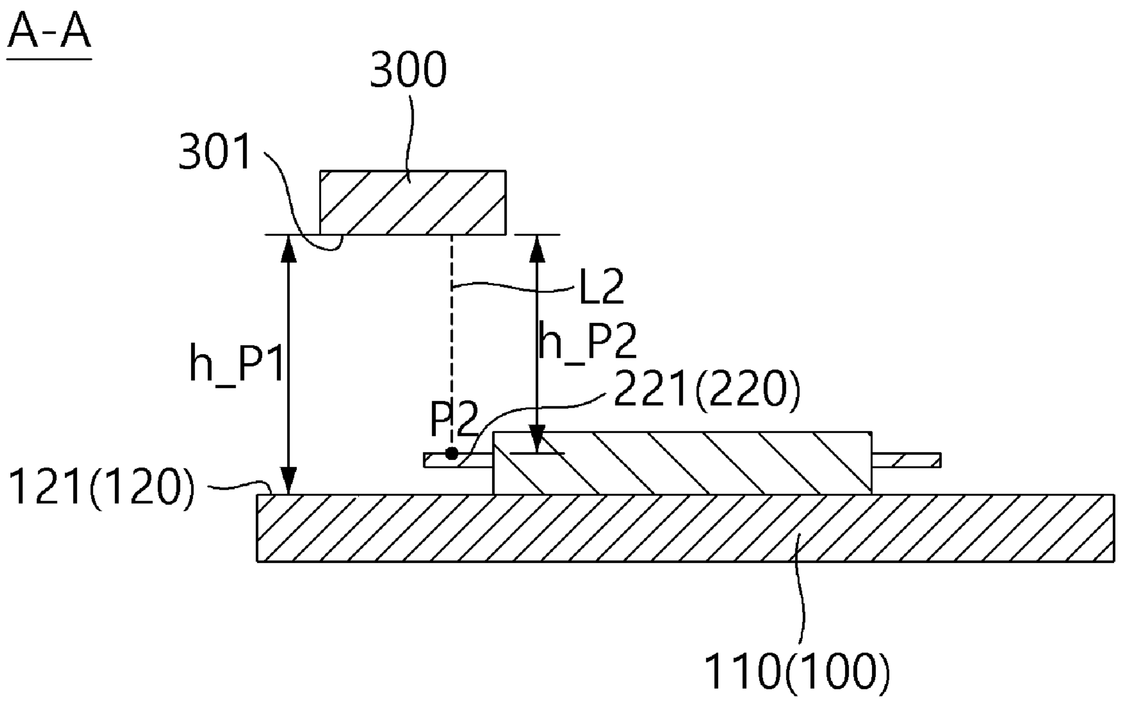
FIG. 9 illustrates a position of a point P2 to acquire height information when a height of the height measurement unit 300 with respect to an upper surface of the mounting unit 100 is constant.

FIG. 9 illustrates a position of a point P2 to acquire height information when a height of the height measurement unit 300 with respect to an upper surface of the mounting unit 100 is constant. In other words, a distance between the upper surface of the mounting unit 100 and the height measurement unit 300 may be constant.

A height of the height measurement unit 300 with respect to the upper surface of the mounting unit 100 may be referred to as a height of the reference plane 301 with respect to the one end portion upper surface 121 of the base 110. The height of the reference plane 301 with respect to the one end portion upper surface 121 may be referred to as a preset height h_P. Therefore, it may be determined whether the first tab 220 is lifted by comparing the second point height h_P2, that is the height of the reference plane 301, with respect to the second point P2, that is one point on the first tab upper surface 221, with the preset height h_P.

Figure 10:
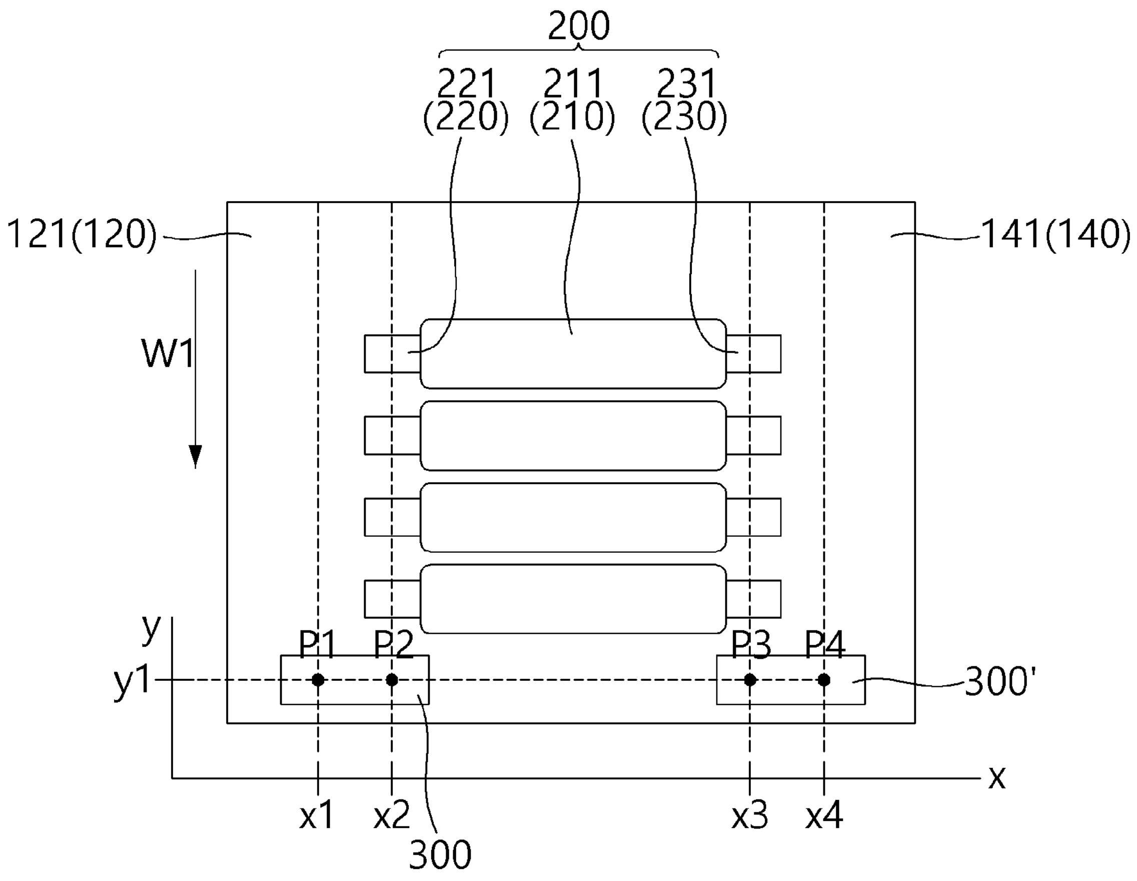
FIG. 10 illustrates, on xy plane, positions of points P1, P2, P3, and P4 to acquire height information when a plurality of battery cells 200 are disposed on the mounting unit 100.

FIG. 10 illustrates, on xy plane, positions of points P1, P2, P3, and P4 to acquire height information when a plurality of battery cells 200 are disposed on the mounting unit 100.

The plurality of battery cells 200 may be arranged in parallel in the y direction, and each battery cell 200 may extend in the x direction.

The plurality of height measurement units 300 and 300' may be provided and may be arranged in parallel in the x direction. Center coordinates of the plurality of height measurement units 300 and 300' may have the same y coordinate. For example, the height measurement units 300 and 300' may be respectively disposed on the one end portion 120 and the other end portion 140.

The −y direction may be referred to as a first direction W1. The mounting unit 100 may move in the first direction W1. The mounting unit 100 may move in the first direction W1 so that the plurality of battery cells 200 sequentially pass below the height measurement units 300 and 300'.

Points at which height information is acquired to determine a state of one battery cell 200 may have the same y-coordinate. For example, the y-axis coordinates of the first point P1, the second point P2, the third point P3, and the fourth point P4 may be the first y value y1.

When the state of the plurality of battery cells 200 is the normal state ST1 and the mounting unit 100 moves in the first direction W1, the first point P1 may be positioned on the one end portion upper surface 121. The second point P2 may be positioned on the first tab upper surface 221 of each of the plurality of battery cells 200. The third point P3 may be positioned on the second tab upper surface 231 of each of the plurality of battery cells 200. The fourth point P4 may be positioned on the other end portion upper surface 141.

Figure 11:
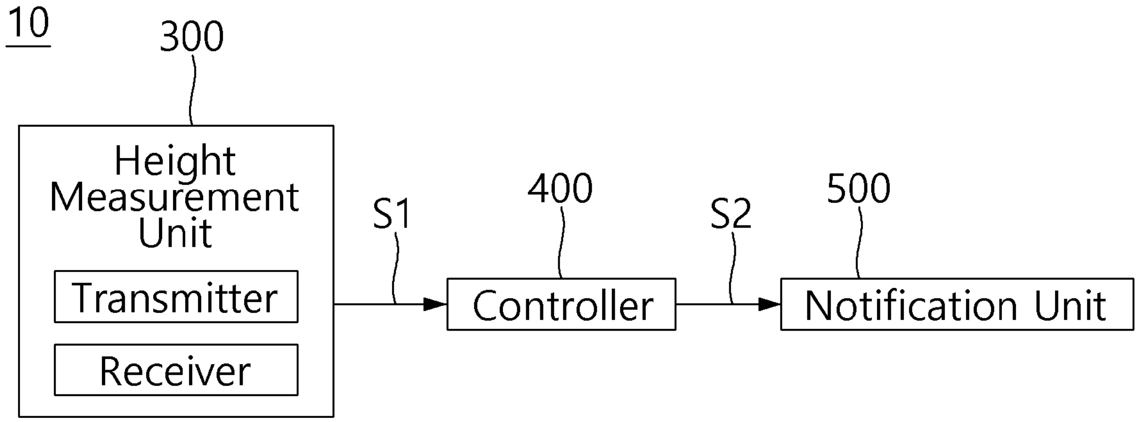
FIG. 11 is a block diagram of a battery cell state sensing device 10 according to an embodiment of the present disclosure.

FIG. 11 is a block diagram of a battery cell state sensing device 10 according to an embodiment of the present disclosure.

The battery cell state sensing device 10 may include the height measurement unit 300, a controller 400, and a notification unit 500.

The height measurement unit 300 may acquire height information of the reference plane 301 with respect to one point on the mounting unit 100 or one point on the battery cell 200 using information of an incident wave output from the transmitter 310 and information of a reflected wave detected by the receiver 320.

The height measurement unit 300 may transmit a first signal S1 including the acquired height information to the controller 400.

The controller 400 may be connected to the height measurement unit 300. The controller 400 may determine a state of the battery cell 200 based on the height information. The controller 400 may transmit a second signal S2 including the state of the battery cell 200 to the notification unit 500.

The notification unit 500 may be connected to the controller 400. The notification unit 500 may notify a user of the state of the battery cell 200 included in the second signal S2.

Figure 12:
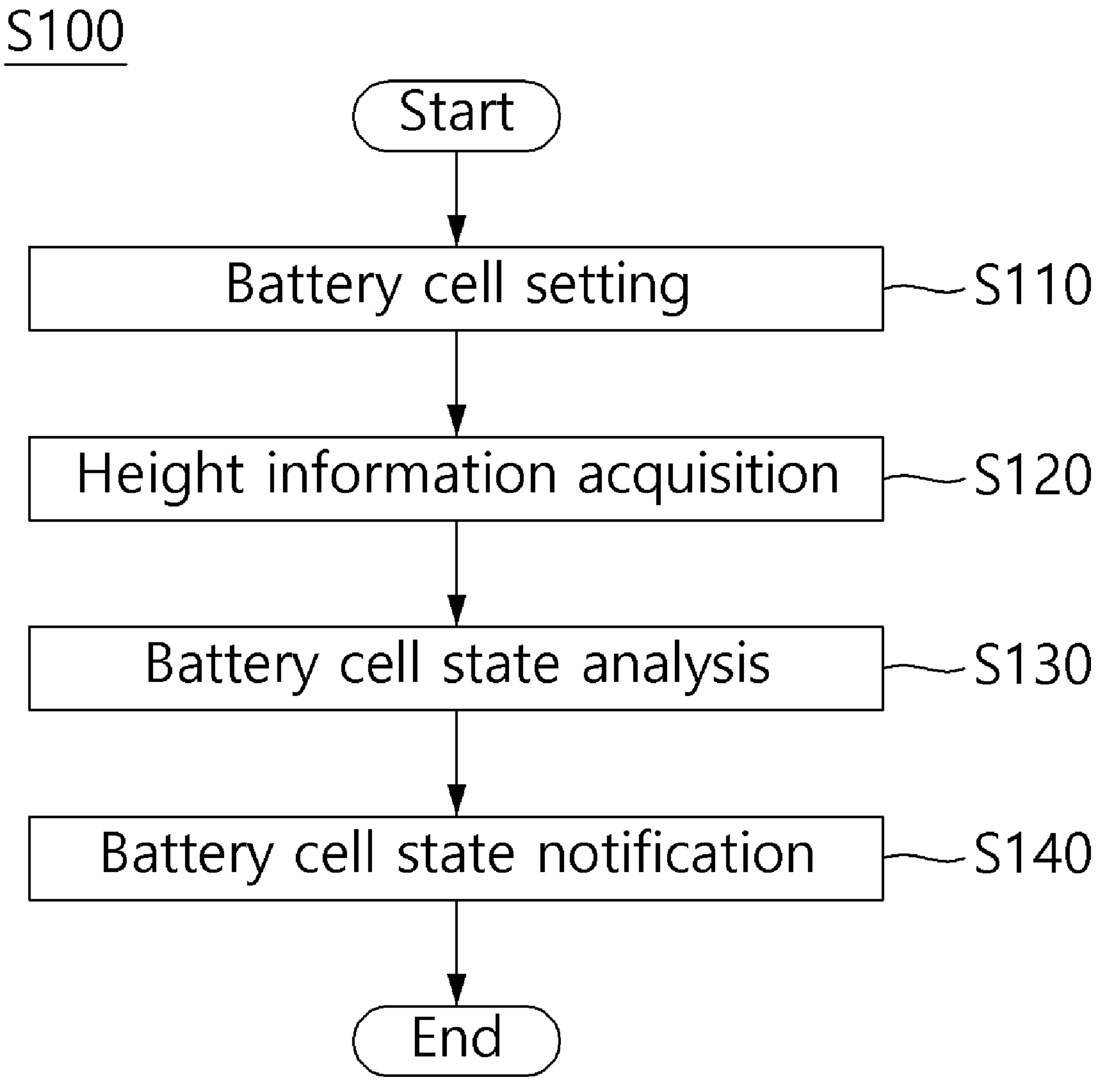
FIG. 12 is a flow chart illustrating a method S100 of sensing a state of a battery cell according to an embodiment of the present disclosure.

FIG. 12 is a flow chart illustrating a method S100 of sensing a state of a battery cell according to an embodiment of the present disclosure.

A method S100 of sensing a state of a battery cell may include a battery cell setting step S110. In the step S110, the battery cell 200 may be disposed on the mounting unit 100. The plurality of battery cells 200 may be disposed on the mounting unit 100.

The method S100 may include a height information acquisition step S120. In the step S120, the height measurement unit 300 may acquire height information of the reference plane 301 of the height measurement unit 300 with respect to one point on the mounting unit 100 or one point on the battery cell 200. Referring to FIG. 3, the height information may include at least one of a first height h1 which is height information of the reference plane 301 with respect to one point of the one end portion upper surface 121, and a second height h2 which is height information of the reference plane 301 with respect to one point of the first tab upper surface 221. Further, for example, the height information may include at least one of height information of the reference plane 301 with respect to one point of the other end portion upper surface 141, and height information of the reference plane 301 with respect to one point of the second tab upper surface 231.

The method S100 may include a battery cell state analysis step S130. In the step S130, the controller 400 may compare the height information acquired in the previous step S120 to analyze the state of the battery cell 200. The controller 400 may determine that the state of the battery cell 200 is the normal state ST1 or the abnormal state ST2.

The method S100 may include a battery cell state notification step S140. In the step S140, the notification unit 500 may receive a state of the battery cell 200 from the controller 400 and notify the user of the state. The notification unit 500 may notify that the state of the battery cell 200 is the normal state ST1 or the abnormal state ST2.

Figure 13:
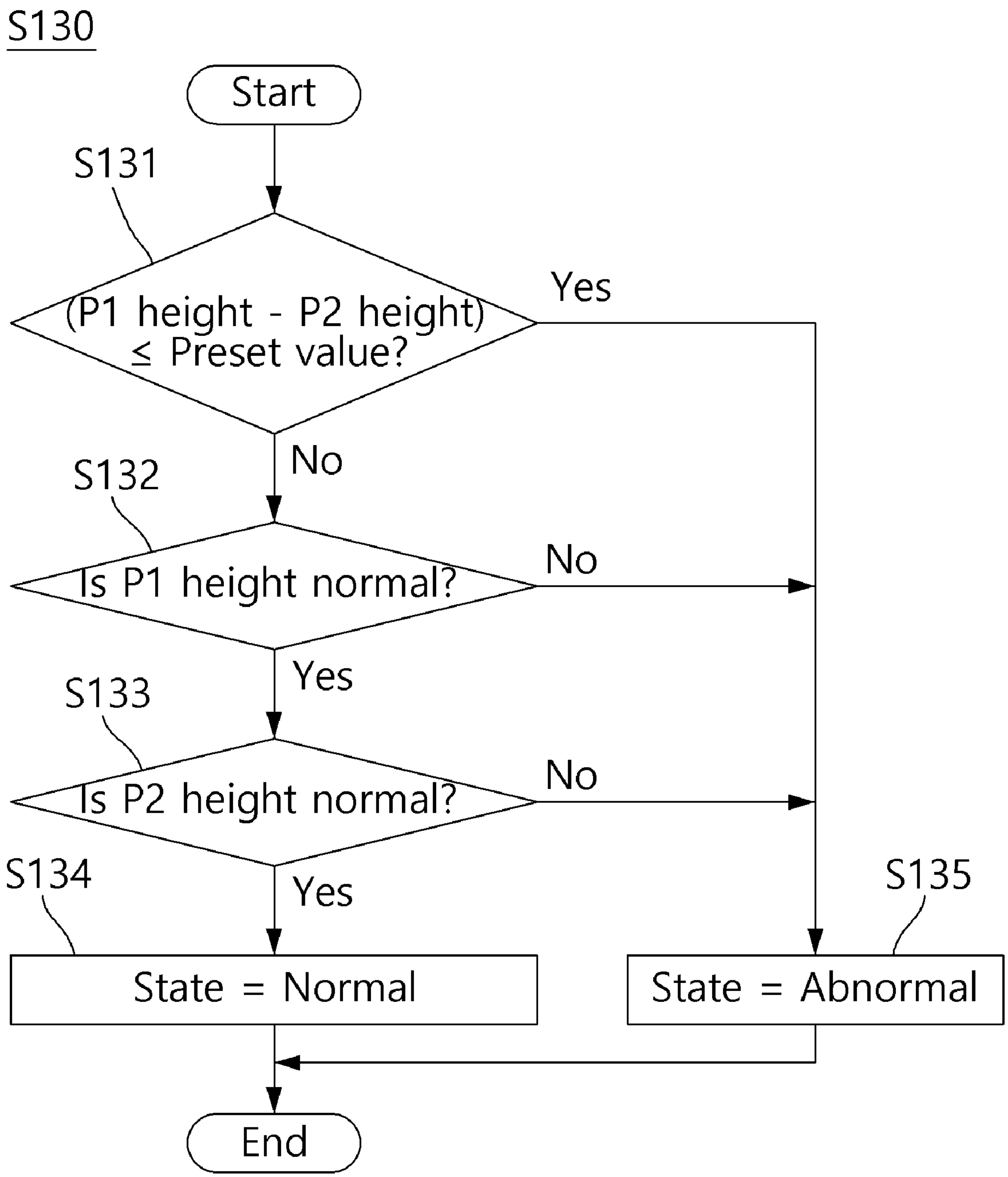
FIG. 13 is a flow chart illustrating a battery cell state analysis step S130 according to an embodiment of the present disclosure.

FIG. 13 is a flow chart illustrating the battery cell state analysis step S130 according to an embodiment of the present disclosure. The battery cell state analysis step S130 is described below with reference to FIGS. 4 to 8.

The battery cell state analysis step S130 may include a first analysis step S131. The step S131 may be a step of determining whether the tabs 220 and 230 are lifted.

For example, the step S131 may be a step of determining whether the second height difference d2 obtained by subtracting the second point height h_P2 from the first point height h_P1 is less than or equal to the preset value d0. When the second height difference d2 is less than or equal to the preset value d0, a second analysis step S132 may be performed. When the second height difference d2 exceeds the preset value d0, a second state input step S135 may be performed.

Alternatively, for example, the step S131 may be a step of determining whether the third height difference d3 obtained by subtracting the third point height h_P3 from the fourth point height h_P4 is less than or equal to the preset value d0. The first analysis step S131 for the third height difference d3 may be performed in the same manner as the first analysis step S131 for the second height difference d2.

The battery cell state analysis step S130 may include the second analysis step S132. The step S132 may be a step of determining whether the battery cell 200 is biasly disposed on the one end portion 120 or the other end portion 140 of the mounting unit 100.

For example, the step S132 may be a step of determining whether a height of the first point P1 is in the normal state ST1. For example, the step S132 may be a step of determining whether the first point P1 is positioned on the one end portion upper surface 121 of the mounting unit 100.

For example, the step S132 may be a step of determining whether the first point height h_P1 is equal to the fourth point height h_P4. When the first point height h_P1 is equal to the fourth point height h_P4, a third analysis step S133 may be performed. When the first point height h_P1 is not equal to the fourth point height h_P4, the second state input step S135 may be performed.

For example, the step S132 may be a step of determining whether the first point height h_P1 is less than the fourth point height h_P4. When the first point height h_P1 is less than the fourth point height h_P4, the second state input step S135 may be performed.

Alternatively, for example, the step S132 may be a step of determining whether a height of the fourth point P4 is in the normal state ST1. For example, the step S132 may be a step of determining whether the fourth point P4 is positioned on the other end portion 140 of the mounting unit 100. For example, the step S132 may be a step of determining whether the fourth point height h_P4 and the first point height h_P1 are the same. For example, the step S132 may be a step of determining whether the fourth point height h_P4 is less than the first point height h_P1.

The battery cell state analysis step S130 may include the third analysis step S133. The step S133 may be a step of determining whether the battery cell 200 is detected. The step S133 may be a step of determining whether the tabs 220 and 230 sag.

For example, the step S133 may be a step of determining whether the second point height h_P2 is in the normal state ST1. For example, the step S133 may be a step of determining whether the second point P2 is positioned on the battery cell 200. For example, the step S133 may be a step of determining whether the second point P2 is positioned on the base 110.

For example, the step S133 may be a step of determining whether the second height difference d2 obtained by subtracting the second point height h_P2 from the first point height h_P1 falls within the preset range, in order to determine whether the second point height h_P2 is in the normal state ST1. For example, when the second height difference d2 is greater than or equal to the minimum value of the preset range, a first state input step S134 may be performed. For example, when the second height difference d2 is less than the minimum value of the preset range, the second state input step S135 may be performed.

Alternatively, for example, the step S133 may be a step of determining whether the third point height h_P3 is in the normal state ST1. For example, the step S133 may be a step of determining whether the third point P3 is positioned on the battery cell 200. For example, the step S133 may be a step of determining whether the third point P3 is positioned on the base 110.

For example, the step S133 may be a step of determining whether the third height difference d3 obtained by subtracting the height of the third point P3 from the height of the fourth point P4 falls within the preset range. The third analysis step S133 for the third height difference d3 may be performed in the same manner as the third analysis step S133 for the second height difference d2.

The battery cell state analysis step S130 may include the first state input step S134. In the step S134, the controller 400 may input the state of the battery cell 200 as the normal state ST1 and end the battery cell state analysis step S130.

The battery cell state analysis step S130 may include the second state input step S135. In the step S135, the controller 400 may input the state of the battery cell 200 as the abnormal state ST2 and end the battery cell state analysis step S130.

When the first analysis step S131 proceeds to the second state input step S135, it may be determined that the tabs 220 and 230 are lifted from the base 110. For example, it may be the state of the battery cell 200 illustrated in FIG. 6.

When the second analysis step S132 proceeds to the second state input step S135, it may be determined that the battery cell 200 is biasly disposed on the one end portion 120 or the other end portion 140. For example, it may be the state of the battery cell 200 illustrated in FIG. 8.

When the third analysis step S133 proceeds to the second state input step S135, it may be determined that the battery cell 200 is not detected at the second point P2 or the first tab 220 sags with respect to the base 110. For example, when the second point height h_P2 is equal to the first point height h_P1, it may be determined that the battery cell 200 is not detected at the second point P2. For example, it may be the state of the battery cell 200 illustrated in FIG. 7. Alternatively, for example, it may be a state in which the battery cell 200 is not disposed on the mounting unit 100.

Figure 14:
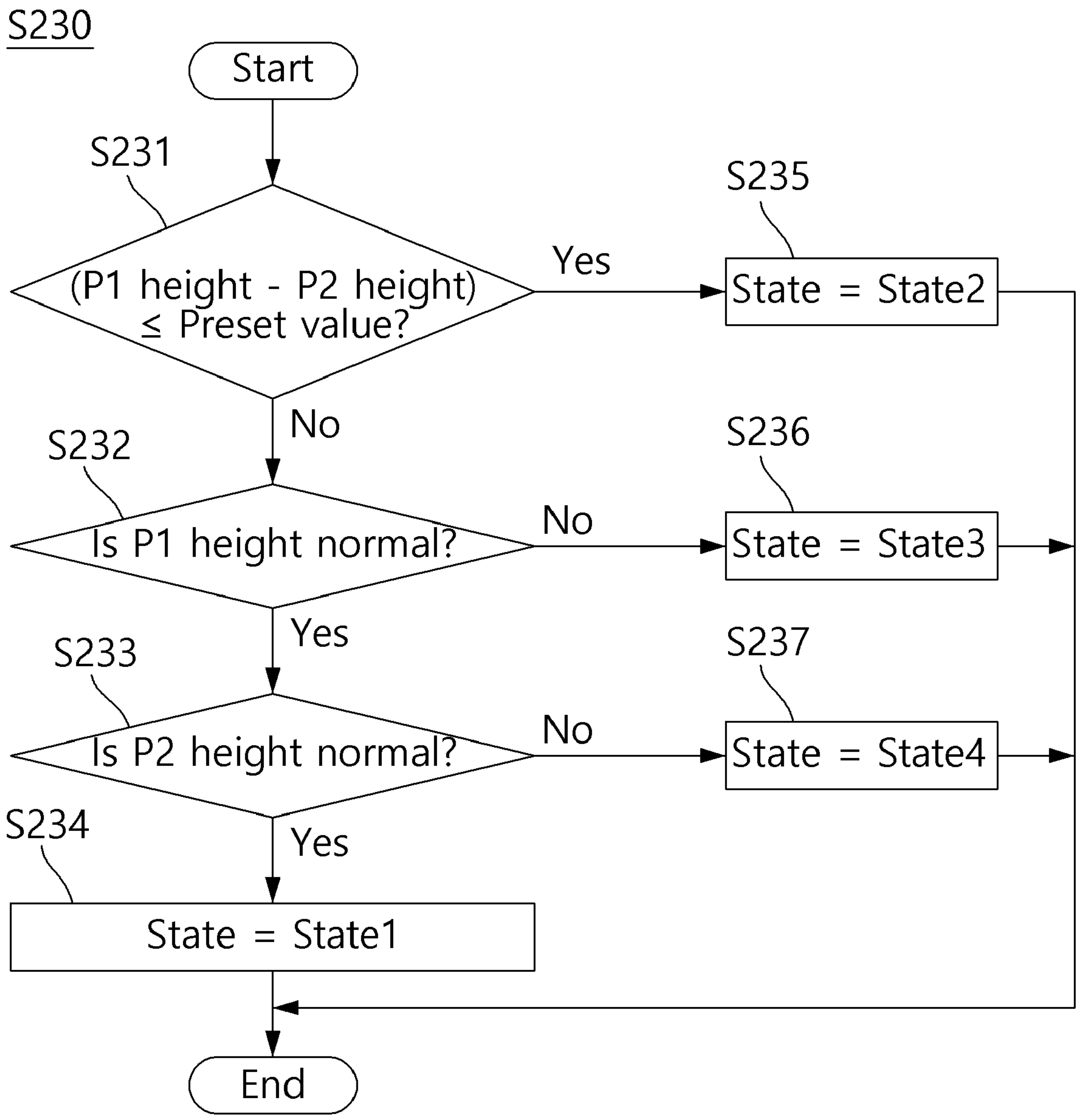
FIG. 14 is a flow chart illustrating a battery cell state analysis step S230 according to another embodiment of the present disclosure.

FIG. 14 is a flow chart illustrating a battery cell state analysis step S230 according to another embodiment of the present disclosure.

The battery cell state analysis step S230 may subdivide the abnormal state ST2 of the battery cell 200, compared to the battery cell state analysis step S130 illustrated in FIG. 13.

The battery cell state analysis step S230 may include a first analysis step S231. The step S231 may be the same as the first analysis step S131 illustrated in FIG. 13. In the step S231, when the second height difference d2 obtained by subtracting the second point height h_P2 from the first point height h_P1 is less than or equal to the preset value d0, a second analysis step S232 may be performed. In the step S231, when the second height difference d2 exceeds the preset value d0, a second state input step S235 may be performed.

The battery cell state analysis step S230 may include the second analysis step S232. The step S232 may be the same as the second analysis step S132 illustrated in FIG. 13. In the step S232, when a height of the first point P1 is normal, a third analysis step S233 may be performed. In the step S232, when the height of the first point P1 is abnormal, a third state input step S236 may be performed.

The battery cell state analysis step S230 may include the third analysis step S233. The step S233 may be the same as the third analysis step S133 illustrated in FIG. 13. In the step S233, when a height of the second point P2 is normal, a first state input step S234 may be performed. In the step S233, when the height of the second point P2 is abnormal, a fourth state input step S237 may be performed.

The battery cell state analysis step S230 may include the first state input step S234. The step S234 may be a step of inputting the state of the battery cell 200 as state1. The state1 may indicate the normal state ST1.

The battery cell state analysis step S230 may include the second state input step S235. The step S235 may be a step of inputting the state of the battery cell 200 as state2. The state2 may indicate a state in which the tabs 220 and 230 are lifted from the base 110.

The battery cell state analysis step S230 may include the third state input step S236. The step S236 may be a step of inputting the state of the battery cell 200 as state3. The state3 may indicate a state in which the battery cell 200 is biasly disposed on the one end portion 120 or the other end portion 140 of the base 110.

The battery cell state analysis step S230 may include the fourth state input step S237. The step S237 may be a step of inputting the state of the battery cell 200 as state4. The state4 may indicate a state in which the battery cell 200 is not detected or the tabs 220 and 230 sag with respect to the base 110.

The battery cell state analysis step S230 may also be equally applied to the third point P3 and the fourth point P4.

Some embodiments or other embodiments of the present disclosure described above are not mutually exclusive or distinct from each other. Configurations or functions of some embodiments or other embodiments of the present disclosure described above can be used together or combined with each other.

It is apparent to those skilled in the art that the present disclosure can be embodied in other specific forms without departing from the spirit and essential features of the present disclosure. Accordingly, the above detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

What is claimed is:

1. A method of sensing a state of a battery cell, the method comprising:

acquiring, by a height sensor disposed above a mounting unit on which the battery cell is disposed, first height information corresponding to a height at a first point corresponding to a point at one end in a longitudinal direction of the mounting unit, second height information corresponding to a height at a second point corresponding to a point on a first tab of the battery cell, and fourth height information corresponding to a height at a fourth point corresponding to a point at an opposite end in the longitudinal direction of the mounting unit; and receiving, by a controller, the first height information, the second height information, and the fourth height information from the height sensor, and performing:

a first analysis step of determining whether the tab of the battery cell is in a lifted state, based on whether a difference between the first height information and the second height information exceeds an upper limit of a preset range;

a second analysis step of, when the difference between the first height information and the second height information does not exceed the upper limit of the preset range, determining whether the battery cell is biasedly disposed on the mounting unit, based on whether the first height information is equal to the fourth height information; and a third analysis step of, when the first height information is identical to the fourth height information, determining whether the tab of the battery cell is in a sagging state, based on whether the difference between the first height information and the second height information is less than a lower limit of the preset range.

2. The method of claim 1, wherein, in the first analysis step, when the difference between the first height information and the second height information exceeds the upper limit of the preset range, the controller determines that an end of the tab of the battery cell is lifted upward relative to the mounting unit.

3. The method of claim 1, wherein, in the second analysis step, when the first height information and the fourth height information are not identical to each other, the controller determines that the battery cell is biasedly disposed adjacent to the one end or the opposite end of the mounting unit.

4. The method of claim 1, wherein, in the third analysis step, when the difference between the first height information and the second height information is equal to or greater than the lower limit of the preset range, the controller determines that the battery cell is in a normal state.

5. The method of claim 1, wherein, in the third analysis step, when the difference between the first height information and the second height information is zero, the controller determines a state in which the battery cell is not detected.

6. The method of claim 1, wherein the height sensor includes a reference plane disposed parallel to an upper surface of the mounting unit, wherein the first height information includes a distance from the reference plane to the first point, the second height information includes a distance from the reference plane to the second point, and the fourth height information includes a distance from the reference plane to the fourth point.

7. The method of claim 1, further comprising a battery cell state notification step of notifying a user of the state of the battery cell determined through the first analysis step, the second analysis step, and the third analysis step by the controller.

8. The method of claim 1 wherein the height sensor further acquires third height information corresponding to a height at a third point corresponding to a point on a second tab of the battery cell, wherein, in the first analysis step, the controller determines whether the tab is in a lifted state based on whether a difference between the fourth height information and the third height information exceeds the upper limit of the preset range.

9. The method of claim 8, wherein, in the third analysis step, when the first height information is identical to the fourth height information, the controller determines whether the tab of the battery cell is in a sagging state based on whether a difference between the fourth height information and the third height information is less than the lower limit of the preset range.

10. The method of claim 1, wherein the height sensor comprises:

a transmitter configured to output an incident wave toward a point of the mounting unit or a point of the battery cell; and a receiver configured to detect a reflected wave formed by reflection of the incident wave from the point of the mounting unit or the battery cell.

11. The method of claim 10, wherein the incident wave includes at least one of a laser, an ultrasonic wave, a microwave, and infrared light.

12. A device of sensing a state of a battery cell disposed on a mounting unit and including a tab, the device comprising:

a height sensor disposed above the mounting unit and configured to acquire first height information corresponding to a first point at one end in a longitudinal direction of the mounting unit, second height information corresponding to a second point on a first tab of the battery cell, and fourth height information corresponding to a fourth point at an opposite end in the longitudinal direction of the mounting unit; and a controller configured to receive the first height information, the second height information, and the fourth height information from the height sensor, wherein the controller is configured to:

determine whether the tab of the battery cell is in a lifted state based on whether a difference between the first height information and the second height information exceeds an upper limit of a preset range;

determine whether the battery cell is biasedly disposed on the mounting unit based on whether the first height information is identical to the fourth height information when the difference does not exceed the upper limit; and determine whether the tab of the battery cell is in a sagging state based on whether the difference between the first height information and the second height information is less than a lower limit of the preset range when the first height information is identical to the fourth height information.

13. The device of claim 12, wherein the height sensor includes:

a transmitter configured to output an incident wave toward a point of the mounting unit or a point of the battery cell; and a receiver configured to detect a reflected wave generated by reflecting the incident wave at the point of the mounting unit or the point of the battery cell.

14. The device of claim 13, wherein the incident wave includes at least one of a laser, an ultrasonic wave, a microwave, or infrared light.

15. The device of claim 14, wherein the height sensor includes at least one of a laser displacement sensor, an ultrasonic displacement sensor, a microwave displacement sensor, or an infrared displacement sensor.

16. The device of claim 12, wherein the battery cell includes a plurality of battery cells, wherein the plurality of battery cells are arranged side by side on the mounting unit, and wherein the mounting unit moves in an arrangement direction of the plurality of battery cells so that the plurality of battery cells sequentially pass below the height sensor.

17. The device of claim 12, wherein the mounting unit extends from one end to other end, wherein the battery cell is disposed between the one end and the other end of the mounting unit, and wherein the height sensor is disposed above each of the one end and the other end of the mounting unit, respectively.

18. The device of claim 12, wherein the height sensor includes a reference plane disposed parallel to an upper surface of the mounting unit, wherein the first height information, the second height information, and the fourth height information each include a distance from the reference plane to a corresponding point.

* * * * *